United States Patent
Nie et al.

(10) Patent No.: US 8,488,597 B2
(45) Date of Patent: Jul. 16, 2013

(54) APPARATUS FOR COLLECTING CHARGING INFORMATION OF A DATA SERVICE AND CHARGING METHOD THEREOF

(75) Inventors: Yanbo Nie, Guangdong (CN); Mingjun Shan, Guangdong (CN); Xuanyi Huan, Guangdong (CN); Li Wang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1424 days.

(21) Appl. No.: 11/414,476

(22) Filed: Apr. 28, 2006

(65) Prior Publication Data
US 2006/0193344 A1    Aug. 31, 2006

Related U.S. Application Data

(63) Continuation-in-part of application No. PCT/CN2004/001224, filed on Oct. 28, 2004.

(30) Foreign Application Priority Data

Oct. 28, 2003    (CN) .......................... 2003 1 0103313

(51) Int. Cl.
*H04L 12/66* (2006.01)
(52) U.S. Cl.
USPC .......................................... 370/353; 370/401
(58) Field of Classification Search
USPC ..................... 370/259, 353, 395.21; 451/406, 451/408
See application file for complete search history.

(56) References Cited

U.S. PATENT DOCUMENTS

| 6,018,652 | A  | * | 1/2000 | Frager et al. | ................... | 455/406 |
| 6,567,179 | B1 |   | 5/2003 | Sato et al. | | |
| 2002/0029197 | A1 | * | 3/2002 | Kailamaki et al. | .............. | 705/40 |

(Continued)

FOREIGN PATENT DOCUMENTS

| CN | 1178937 A | 4/1998 |
| CN | 1395391 A | 2/2003 |

(Continued)

OTHER PUBLICATIONS

International Search Report for International Application No. PCT/CN2004/001224, mailed Mar. 3, 2005.

(Continued)

*Primary Examiner* — Huy D Vu
*Assistant Examiner* — Adnan Baig

(57) ABSTRACT

The present invention discloses an apparatus for collecting charging information of data service and charging method thereof. The apparatus comprises: a protocol distribution processing module, for classifying service data received from a gateway service node in the wireless network by the protocol type, and sending the classified service data to a protocol processing module of the corresponding protocol type; receiving service data from said one or more than one protocol processing module and sending the service data to the gateway service node; at least one protocol processing module, for receiving the classified service data from the protocol distribution processing module, obtaining charging information of the service data and sending the charging information to a charging system, and transparently transmitting the service data to a packet switched domain network; receiving the service data from a packet switched domain network, obtaining the charging information of the service data and sending the charging information to the charging system, and transparently transmitting the service data to the protocol distribution processing module. This invention can accurately collect the charging information of service data of various classes.

14 Claims, 2 Drawing Sheets

U.S. PATENT DOCUMENTS

| | | | | |
|---|---|---|---|---|
| 2002/0072333 | A1* | 6/2002 | Gnesda et al. | 455/67.1 |
| 2002/0138601 | A1 | 9/2002 | Piponius et al. | |
| 2003/0053448 | A1* | 3/2003 | Craig et al. | 370/353 |
| 2003/0061160 | A1 | 3/2003 | Asahina | |
| 2003/0108057 | A1* | 6/2003 | Suzuki et al. | 370/401 |
| 2004/0148384 | A1* | 7/2004 | Ramakrishnan et al. | 709/224 |
| 2004/0229609 | A1 | 11/2004 | Yamaguchi | |
| 2004/0266394 | A1* | 12/2004 | Mizell et al. | 455/408 |
| 2005/0009500 | A1* | 1/2005 | Ear | 455/408 |
| 2006/0111077 | A1* | 5/2006 | Hurtta | 455/406 |

FOREIGN PATENT DOCUMENTS

| | | | |
|---|---|---|---|
| EP | 1469694 A1 | 10/2004 | |
| JP | 06-104922 A | 4/1994 | |
| JP | 2000252979 A | 9/2000 | |
| JP | 2002171367 A | 6/2002 | |
| JP | 2001-77860 A | 9/2002 | |
| JP | 2003-298615 A | 10/2003 | |
| WO | WO 01/31889 A2 | 5/2001 | |
| WO | WO0169891 A | 9/2001 | |
| WO | WO 02/067600 A1 | 8/2002 | |
| WO | WO02082724 A | 10/2002 | |
| WO | 03/061323 | 7/2003 | |

OTHER PUBLICATIONS

Japanese Office Action in corresponding Japanese Application No. 2006-537037, dated Aug. 8, 2008 (with English translation).

Korean Office Action in Corresponding Korean Application No. 10-2006-7009486, mailed May 7, 2007.

Brief Translation of Korean Office Action in Corresponding Korean Application No. 10-2006-7009486 (NPL Cite No. 1).

Brief translation of Korean Patent Application Laid-open Publication No. 1998-44110 dated Sep. 5, 1998, and cited in Korean Office Action for Corresponding Korean Application No. 10-2006-7009486.

English abstract of Korean Patent Application Laid-open Publication No. 1998-25879, published Mar. 29, 2003, and cited in Korean Office Action for corresponding Korean Application No. 10-2006-7009486 (U.S. Patent Application Publication Cite No. 1)

Written Opinion of the International Searching Authority dated Mar. 3, 2005 in connection with International Patent Application No. PCT/CN2004/001224.

Communication pursuant to Article 94(3) EPC dated May 4, 2010 in connection with European Patent Application No. 04789883.8.

Supplementary European Search Report dated Jan. 13, 2010 in connection with European Patent Application No. 04789883.8.

Partial Translation Office Action dated Jan. 12, 2007 in connection with Chinese Patent Application No. 200310103313.1.

"3rd Generation Partnership Project; Technical Specification Group Services and System Aspects; General Packet Radio Service (GPRS); Service description, Stage 1 (Release 1999)", 3GPP, 2000, 27 pages.

Office Action dated Jul. 13, 2010 in connection with Japanese Patent Application No. 2006-537037.

* cited by examiner

APPARATUS FOR COLLECTING CHARGING INFORMATION OF A DATA SERVICE AND CHARGING METHOD THEREOF

CROSS-REFERENCE TO RELATED APPLICATIONS

This application is a continuation-in-part of PCT Application No. PCT/CN2004/001224, filed Oct. 28, 2004, pending, which designates the U.S., which is hereby incorporated herein by reference in its entirety, and which claims priority from Chinese Application No. 200310103313.1, filed Oct. 28, 2003.

FIELD OF THE TECHNOLOGY

The present invention relates to techniques for collecting charging information of a packet data service in a wireless network, and particularly, to an apparatus for collecting charging information of a packet data service and charging method thereof.

BACKGROUND OF THE INVENTION

Wireless networks, with their fast development, are available to provide data services based on a packet-based network. The integration of a wireless packet-based network and an Internet has formed a good foundation for the development of wireless data services. At the same time, the traditional mode of service charging in the wireless network, such as charging the voice service based on time duration, can no longer satisfy the demand of data services. Therefore, the charging mode of data service has become a focus in the technical field.

The charging modes of data services include volume based charging mode, content based charging mode, application based charging mode, and time-duration based charging mode. For example, Multimedia Messaging Service (MMS) is charged by content, i.e., charged by each piece of message regardless of volume of flow. For another example, stream media video service may be charged according to the actual volume of flow, or charged by content as well.

At present, collecting points of charging information generally involve various devices, including Serving GPRS Support Nodes (SGSN), Gateway GPRS Support Nodes (GGSN), Wireless Access Protocol Gateways (WAP GW), and service servers. Typically, the volume charging information of a service is collected at the SGSN or the GGSN and it is sent to a Service Control Point (SCP) or other charging devices for cost deductions and terminal charges, while the content, application or time duration charging information is collected at the service servers and is sent to the SCP or other charging devices for cost deductions and terminal charges.

SUMMARY OF THE INVENTION

The present invention is directly toward to an apparatus applied in a wireless network for collecting charging information of a data service, comprising: a protocol distribution processing module for classifying service data received from a gateway service node in the wireless network by protocol type, and sending the classified service data to a protocol processing module of the corresponding protocol type; receiving service data from one or more than one protocol processing module and sending the service data to the gateway service node;

said one or more than one protocol processing module for receiving the classified service data from the protocol distribution processing module corresponding to the protocol type, obtaining charging information of the service data and sending the charging information to a charging system, and transmitting the service data transparently to a packet switched domain network; receiving the service data from a packet switched domain network, obtaining the charging information of the service data and sending the charging information to the charging system, and transmitting the service data transparently to the protocol distribution processing module.

Meanwhile, the present invention also provides a charging method for data service in a wireless network, comprising:

A. deciding protocol type of received service data, and classifying the received service data in terms of the protocol type of the service data;

B. obtaining charging information of the received service data having been classified, respectively, and sending the obtained charging information to a charging system for charging.

As can be seen from the above, according to the present invention, an apparatus for collecting charging information of data service is added between the GGSN and the packet-based network. The charging information being collected comprises all information of volume, content, time duration and application charging mode of the service data, such as the volume and time duration of the data service and the service class of the service data. The collecting apparatus of charging information of a data service classifies the service data according to the protocol type thereof, processes the service data of different protocol types in different protocol processing modules, obtains Charging Data Record (CDR) information of different service data for charging, and charges the corresponding data service in a prepaid charging system or a real-time charging system based on the CDR information. Therefore, the apparatus and method of this invention can implement a uniform collection of the charging information of data services so as to send the information to the charging system for charging in corresponding charging modes.

As the charging information collected by the apparatus of the present invention comprises the service class of the service data, even if the charging system has charged the service data based on the content charging information collected by other service servers, the charging system can still differentiate the service class of the service data and recognize the service data based on the charging information collected by the apparatus of this invention, and thus no more charging will be done. Consequently, the problem of repeated charging on the existing wireless networks can also be solved by this invention.

EMBODIMENTS OF THE INVENTION

In order to make the objects, technical solutions and merits of this invention clearer, a further detailed description of embodiments of the invention is given hereinafter with reference to accompanying drawings.

Figure 1:
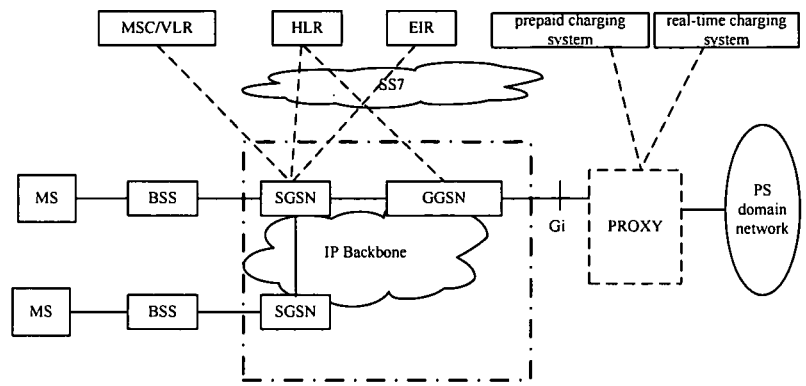
FIG. 1 is a diagram illustrating the system architecture for collecting volume information of service data in a wireless network according to an embodiment of the present invention.

In an embodiment of the present invention, an apparatus for collecting charging information of data service is connected between a GGSN and a packet switched domain network. As shown in FIG. 1, which is a diagram illustrating the system architecture for collecting volume information of service data in a wireless network according to this embodiment, a Mobile Station (MS) accesses a SGSN via a Base Station Subsystem (BSS). By help of a Mobile Switching Centre (MSC), an HLR, and an Equipment Identity Register (EIR), the SGSN makes the decision which GGSN is to be accessed by the MS and performs the accessing, and the GGSN decides through the HLR which packet switched domain network is to be accessed by the MS and implements the accessing for the MS to the appropriate packet switched domain network. The outside interface of this system consists of various service servers, and the service servers may be located at different points, e.g., at the GGSN or the SGSN, for collecting content, time duration or application charging information of service data of various classes. When the charging information of the data service is collected for this MS, a PROXY device is added between a Gi interface of the GGSN and the packet switched domain network, where the PROXY device collects the CDR information of the service data the MS accesses. According to the CDR information, accurate differentiation on classes of the service data can be made and the charging information of the service data will be obtained. The service data class and the charging information thereof which are obtained through the analysis on the CDR information are sent to a prepaid charging system or a real-time charging system for charging operation. The interworking of the MSC, the HLR, and the EIR with the SGSN is carried out by means of Signaling System No. 7 (SS7), the interworking of the HLR and the SCP with the GGSN is implemented via the SS7, the interworking of the prepaid charging system and the real-time charging system with the PROXY device is performed using the IP, and the interworking between the SGSN and the GGSN is upon the IP Backbone.

Figure 2:
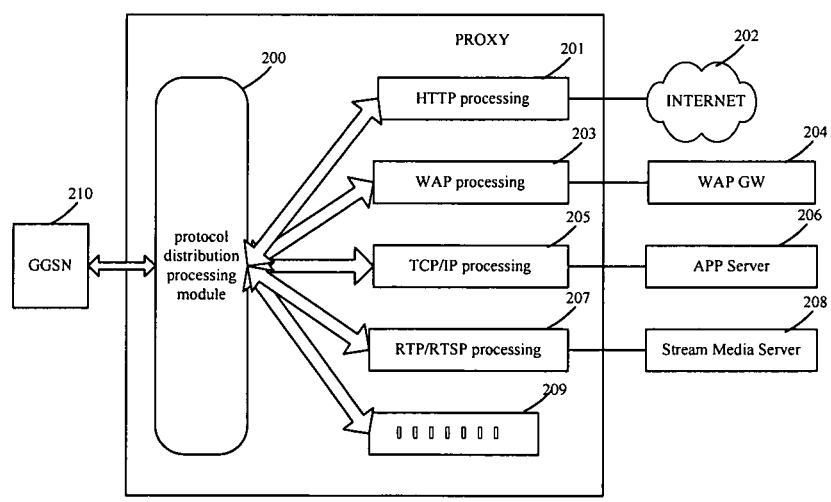
FIG. 2 is a diagram illustrating detailed structure of a PROXY device according to an embodiment of the present invention.

The detailed structure of the PROXY device is shown in FIG. 2, which comprises a protocol distribution processing module 200, an HTTP processing module 201, a WAP processing module 203, a TCP/IP processing module 205, a RTP/RTSP processing module 207, and other protocol processing modules 209.

The service data from a packet switched domain network is sent to different protocol processing modules according to IP port numbers of the protocol types, e.g., the service data from an INTERNET 202 is sent to the HTTP processing module 201, the service data from a WAP GW 204 is sent to the WAP processing module 203, the service data from an APP (Application) server 206 is sent to the TCP/IP processing module 205, and the service data from a Stream Media Server 208 is sent to the RTP/RTSP processing module 207. The different protocol modules make processing for the service data of corresponding protocol types, respectively, and obtain the CDR information of the service data thereof. After that, the service data is transparently transmitted to the appropriate MS via the protocol distribution processing module 200 and the GGSN 210. When the MS is a prepaid subscriber, the obtained CDR information of the service data is sent to the prepaid charging system; when the MS is a real-time charged subscriber, the obtained CDR information of the service data is sent to the real-time charging system.

The service data from an MS is sent via the GGSN 210 to the protocol distribution processing module 200, which will distribute the service data to its corresponding protocol processing module for processing according to the IP port number of the protocol type of the service data, and obtain the CDR information of the service data before transparently transmitting the service data to the appropriate packet switched domain network via its corresponding protocol processing module. The prepaid charging system or the real-time charging system will then perform charging for the MS according to the CDR information of the service data.

In the protocol distribution module of the apparatus, service data based on different application layer protocols can be identified through the IP port number carried in the protocol of the service data, e.g., the port number of the HTTP is 80.

When the HTTP or the WAP is used as the application layer transfer protocol, the visited URL of the service data can be collected at the PROXY device as the identity of the service class. For example, when the URL of the HTTP is set as www.mmsc.com.cn, the service class of the service data is recognized as data of MMS service and the volume-based charging system will charge the service data by the mode of MMS service; when the URL of the HTTP is set as www.kjava.com.cn, the service class of the service data is recognized as data of KJAVA service and the volume-based charging system will charge the service data by the mode of KJAVA service.

The physical carrier of the device may be a minicomputer or a workstation, etc. The PROXY device may be integrated in the GGSN, but it must be situated on a Gi interface between the GGSN and the INTERNET so that the data stream of the Gi interface may be transparently transmitted through the PROXY device. The PROXY device may be integrated in the WAP GW as well.

Figure 3:
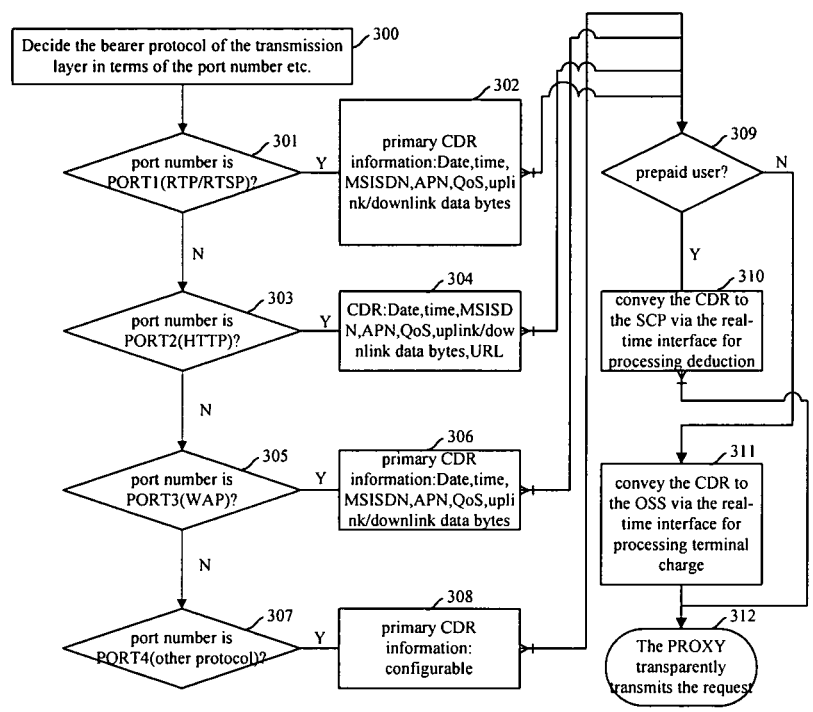
FIG. 3 is a flowchart of volume-based charging on service data by means of the PROXY device according to an embodiment of the present invention.

As shown in FIG. 3, which is a flowchart of volume-based charging on service data by means of the PROXY device according to an embodiment of the present invention, the specific procedure comprises:

Step 300: When collecting statistics on volumes of the service data, decide the bearer protocol of the transmission layer of the service data in terms of the transmission port number of the IP layer;

Steps 301~302: If the port number of the service data is PORT1, i.e., the bearer protocol of the transmission layer of the service data is the RTP/RTSP protocol, the CDR information of the service data will be picked up by the RTP/RTSP processing module, and then Step 309 will be executed. The CDR information comprises: date and time when the transmission of the service data starts, MSISDN for receiving and sending the service data, an IMSI, transport protocol of the service data-Transmission Control Protocol/ User Datagram Protocol (TCP/UDP), IP address and port number of the MS for receiving and sending the service data, an APN, a granted QoS, uplink number of bytes transmitted and downlink number of bytes transmitted.

Steps 303~304: If the port number of the service data is PORT2, i.e., the bearer protocol of the transmission layer of the service data is the HTTP protocol, the CDR information of the service data will be extracted by the HTTP processing module, and then Step 309 will be executed. The CDR information comprises: date and time when the transmission of the service data starts, MSISDN for receiving and sending the service data, an IMSI, transport protocol of the service data-HTTP, a URL, a GGSN IP address, a SGSN IP address, uplink number of bytes transmitted and downlink number of bytes transmitted.

Steps 305~306: If the port number of the service data is PORT3, i.e., the bearer protocol of the transmission layer of the service data is the WAP protocol, the CDR information of the service data will be fetched by the RTP/RTSP processing module, and then Step 309 will be executed. The CDR information is the same as the information in Steps 301 and 302.

Steps 307~308: If the port number of the service data is PORT4, i.e., the bearer protocol of the transmission layer of the service data is another protocol, the CDR information of the service data will be picked up by the other protocol processing module, and then go to Step 309. The CDR information can be configured according to the user's demand.

Step 309: Decide whether the MS for receiving and sending the service data is a prepaid user, and if yes, go to Step 310, if no, go to Step 311.

Step 310: The PROXY device conveys the CDR information of the service data to the prepaid charging system via the real-time interface between the PROXY device and the prepaid charging system. The prepaid charging system implements charging for the MS which receives and sends the service data according to the CDR information, and goes to Step 312.

Step 311: The PROXY device transfers the CDR information of the service data to the real-time charging system via the real-time interface between the PROXY device and the real-time charging system. The real-time charging system accomplishes charging for the MS which receives and sends the service data according to the CDR information, and goes to Step 312.

The real-time charging system or the prepaid charging system presets different charging modes according to the protocol types of the service data. When the real-time charging system or the prepaid charging system charges the service data received and sent by the MS in terms of the CDR information, the charging system will learn the protocol type of the received and sent service data from the CDR information, and thereby know which charging mode the service data of this protocol type should be charged and charge it by this mode. For example, the HTTP service is charged by piece of message. When the MS receives or sends service data, the PROXY device will capture the service data and collect the CDR information of the service data, which comprises protocol type of the service data. Suppose that the protocol of the service data is HTTP, after sending the CDR information of the service data to the real-time charging system or the prepaid charging system, the real-time or prepaid charging system will learn the class of the service data from the CDR information and know that the service data is to be charged by piece of message according to the presetting. Then the charging system will charge according to the content-based charging bill generated by the service data rather than the volume-based charging bill thereof.

The real-time charging system or the prepaid charging system may also preset different charging modes according to the service classes or URLs of service data. When the CDR information of the service data collected by the PROXY device is sent to the charging system, the real-time or prepaid charging system will perform charging according to the CDR information. When the class of the service data is defined as content-based charging, the service data will be charged according to the generated content-based charging bill; when the class of the service data is defined as volume-based charging, the service data will be charged according to the generated volume-based charging bill.

In case that a service server has collected the information of certain service data and has deducted the cost thereof in the real-time or prepaid charging system, the real-time or prepaid charging system is aware that the service data captured by the PROXY device is the same as the service data captured by the service servers according to the CDR information of the service data collected by the PROXY device, and will no longer deduct the cost for the service data captured by the PROXY device.

How a real-time or prepaid charging system charges different service data is set beforehand, and the embodiment merely provides an apparatus for collecting service data. The collecting apparatus gathers the charging information for the service data, and forms the CDR information. The CDR information of the service data comprises all the charging information of the service data needed by the real-time or prepaid charging system, and it prevents the real-time charging system from charging the same service data twice.

A real-time charging system will calculate the cost of service data in real time and charge the cost a certain time later, while a prepaid charging system will set and store an account for a prepaid user in advance with money prepaid, and deduct the cost of service data from the account.

Step 312: While making deductions or terminal charges for the appropriate MS according to the service data flow, the PROXY device transparently transmits the service data, which is sent to the appropriate MS via the GGSN and the SGSN.

Another embodiment is hereinafter described for this invention, e.g., when an MS browses www.sina.com.cn/entertainment.html by the HTTP protocol, the number of the IP port accessing the PROXY device is detected as 80 via the IP layer, thus it is known that the protocol type of the service data is HTTP, and the volume-based charging rate for the HTTP protocol is adopted. If it is defined as charge based on URL, the charging will be performed in accordance with the rate of the specific accessed URL. If it is defined as charge based on QoS, the charging rate varies with the QoS.

The embodiments of this invention make it possible to charge accurately for the service data, which meets the charging demand for service data, and provides a solution for preventing repeated charging for the service data in the existing wireless network, thus it better promotes packet data service for network operators, encourages the users' consumption, and creates more business income. The embodiment provides a solution to accurate charging by means of only one or a few APNs for various classes of data service. With regard to the service data of prepaid users, the present invention solves the problem of real-time deduction and charging in the prepaid charging mode by offering support on the interface with SCP. The apparatus provided by the embodiment of this invention is characterized as expandable, and when a new type of application layer protocol is added, no change will be implemented on the modules such as the protocol distribution processing module, and only a processing and collecting module for the new protocol type will be added.

The foregoing is only descriptions of preferred embodiments of this invention and should not be construed as limiting the invention. Any modification, equivalent substitution, or improvement made without departing from the spirit and principle of the invention should be covered by the protection scope of the present invention.

The invention claimed is:

1. A charging method for data service in a wireless network, the method comprising:
    receiving, at a protocol distribution processing module within a proxy device, first service data from a mobile Station (MS) via a gateway service node, wherein the proxy device is located between a gateway service node and a packet switched domain network and the first service data comprises at least one of the following: Hyper Text Transfer Protocol (HTTP) service data, Wireless Application Protocol (WAP) service data, Transmission Control Protocol/Internet Protocol (TCP/IP) service data or Real Time Protocol/ Real Time Session Protocol (RTP/RTSP) service data;

classifying the received first service data according to a protocol type of the first service data;

distributing the classified first service data to one of a plurality of protocol processing modules within the proxy device according to the classified protocol type;

at the one of the plurality of protocol processing modules, extracting charging information of the classified first service data, wherein the charging information comprises the protocol type of the first service data;

sending the charging information to a charging system for charging;

transmitting, from the one of the plurality of protocol processing modules, the respective classified first service data transparently to the packet switched domain network;

wherein when a service server has collected charging information of second service data, wherein the second service data has a second protocol type, and the second service data has been charged based on one charging mode according to the collected charging information of the second service data at the service server by the charging system, the method further comprises:

determining, by the charging system, if the first service data from which the charging information is extracted at the proxy device has the same protocol type as the second service data from which the charging information is extracted at the service server according to the charging information of the first service data collected by the proxy device;

if the first service data has a different protocol type than the second service data, at the charging system, charging the first service data by a charging mode corresponding to the protocol type of the classified service data received at the proxy device, wherein the first service data is classified by the protocol type, wherein the charging modes of data services include a volume based charging mode and a content based charging mode; and if the first service data has the same protocol type as the second service data, the charging system does not charge for the first service data according to the charging information of the first service data collected at the proxy device.

2. A charging method according to claim 1, wherein sending the charging information to a charging system comprises:
deciding a type of the mobile subscriber; and
sending the charging information to a charging system depending on the type of mobile subscriber.

3. The method according to claim 1, further comprising:
receiving, by the one of the plurality of protocol processing modules, first service data from the packet switched domain network according to the protocol type of the first service data;
at one of the plurality of protocol processing modules, extracting the charging information of the first service data and sending the charging information to the charging system for charging;
transmitting, from the one of the plurality of protocol processing modules, the first service data transparently to the protocol distribution processing module; and
transmitting, from the protocol distribution processing module, the first service data transparently to the MS via the gateway service node.

4. The method according to claim 1, wherein said protocol type of the service data comprises at least one of HTTP, WAP, TCP/IP, or RTP/RTSP.

5. The method according to claim 1, wherein the charging information comprises: time and date for receiving the service data, an MSISDN of the MS for receiving the service data, an IMSI, protocol type adopted by the service data, IP port number of the service data, APN, QoS, and transmitted bytes of uplink or downlink service data; and
when the protocol processing module is an HTTP processing module, said charging information further comprises: a URL.

6. The method according to claim 1, wherein the charging information comprises: time and date when the transmission of the service data starts, MSISDN for receiving and sending the service data, an IMSI, HTTP transport protocol of the service data, a URL, a Gateway GPRS Support Nodes (GGSN) IP address, a Serving GPRS Support Nodes (SGSN) IP address, transmitted bytes of uplink or downlink service data.

7. A system applied in a wireless network for collecting charging information of a data service, the system comprising a proxy device and a charging system,
the proxy device comprising:
a protocol distribution processing module configured to classify first service data according to a protocol type of the first service data which is received from a Mobile Station (MS) via a gateway service node in the wireless network and to send the classified first service data to one of a plurality of protocol processing modules corresponding to the protocol type of the first service data wherein the first service data comprises at least one of the following: Hyper Text Transfer Protocol (HTTP) service data, Wireless Application Protocol (WAP) service data, Transmission Control Protocol/Internet Protocol (TCP/IP) service data or Real Time Protocol/ Real Time Session Protocol (RTP/RTSP) service data;
said one of the plurality of protocol processing modules, each of which corresponds to a protocol type, configured to receive the classified first service data from the MS via the protocol distribution processing module corresponding to the protocol type, extract charging information of the classified first service data, wherein the charging information comprises the protocol type of the first service data, send the charging information of the classified first service data to a charging system for charging by a charging mode corresponding to the protocol type of the first service data, and transmit the classified first service data transparently to a packet switched domain network; and
the charging system configured to, when a service server has collected charging information of second service data having a second protocol type and the second service data has been charged based on one charging mode according to the collected charging information of the second service data at the service server by the charging system, determine if the first service data from which the charging information is extracted at the proxy device has the same protocol type as the second service data from which the charging information is extracted at the service server according to the charging information of the first service data collected by the proxy device, wherein
if the first service data has a different protocol type than the second service data, the charging system is configured to charge the first service data by a charging mode corresponding to the protocol type of the classified first service data received at the proxy device, wherein the first service data is classified by the protocol type, wherein the charging modes of data services include a volume based charging mode and a content based charging mode; and if the first service data has the same protocol type as the second service data, the charging system is configured to not charge for the first service data according to the charging information of the first service data collected at the proxy device.

8. The system according to claim 7, wherein
the protocol distribution processing module is further configured to receive third service data from at least one protocol processing module connected to a packet switched domain network and to transparently transmit the third service data to the MS via the gateway service node;

wherein said at least one protocol processing module is further configured to receive the third service data from the packet switched domain network according to a protocol type of the third service data, extract charging information of the third service data and send the charging information of the third service data to the charging system for charging by a charging mode corresponding to the protocol type of the third service data, and transmit the third service data transparently to the MS via the protocol distribution processing module and the gateway service node.

9. The system according to claim 7, wherein said proxy device is situated on a Gi interface between the gateway service node of the wireless network and the packet switched domain network.

10. The system according to claim 7, wherein the proxy device is integrated into the gateway service node of the wireless network or a Wireless Application Protocol gateway of the wireless network.

11. The system according to claim 7, wherein said at least one protocol processing module further comprises at least one of the following modules:

a Hyper Text Transfer Protocol (HTTP) processing module configured to receive HTTP service data from the protocol distribution processing module, obtain charging information of the service data and send the charging information to the charging system, transparently transmit the service data to the packet switched domain network, receive HTTP service data from the packet switched domain network, obtain charging information of the service data and send the charging information to the charging system, and transparently transmit the service data to the protocol distribution processing module;

a Wireless Application Protocol (WAP) processing module configured to receive WAP service data from the protocol distribution processing module, obtain charging information of the service data, send the charging information to the charging system and transparently transmit the service data to the packet switched domain network, receive WAP service data from the packet switched domain network, obtain charging information of the service data and send the charging information to the charging system, and transparently transmit the service data to the protocol distribution processing module;

a Transmission Control Protocol/ Internet Protocol (TCP/IP) processing module configured to receive TCP/IP service data from the protocol distribution processing module, obtain charging information of the service data, send the charging information to the charging system, transparently transmit the service data to the packet switched domain network, receive TCP/IP service data from the packet switched domain network, obtain the charging information of the service data and send the charging information to the charging system, and transparently transmit the service data to the protocol distribution processing module; and a Real Time Protocol/ Real Time Session Protocol (RTP/RTSP) processing module configured to receive RTP/RTSP service data from the protocol distribution processing module, obtain charging information of the service data, send the charging information to the charging system, transparently transmit the service data to the packet switched domain network, receive RTP/RTSP service data from the packet switched domain network, obtain charging information of the service data, send the charging information to the charging system, and transparently transmit the service data to the protocol distribution processing module.

12. The system according to claim 7, wherein the charging information comprises at least: time and date for receiving the service data, a Mobile Subscriber ISDN Number (MSISDN) of the MS for receiving the service data, an International Mobile Subscriber Identity (IMSI), protocol type adopted by the service data, Internet Protocol (IP) port number of the service data, Access Point Name (APN), Quality of Service (QoS), and transmitted bytes of uplink or downlink service data.

13. The system according to claim 12, wherein when the at least one protocol processing module is an HTTP processing module, said charging information further comprises:

a Uniform Resource Locator (URL), wherein a service class of the service data is recognized by the URL.

14. The system according to claim 7, wherein said classifying the first service data by protocol type comprises: performing the classification according to an Internet Protocol (IP) port number of the first service data.

* * * * *